United States Patent [19]

Vaccaro

[11] Patent Number: 4,790,733

[45] Date of Patent: Dec. 13, 1988

[54] ROTARY CYLINDER CONFIGURATION AND METHOD TO CONTROL SLOT DIMENSIONS DURING DIRECT WELD ATTACHMENT TO THE SHELL

[75] Inventor: Joseph P. Vaccaro, Chittenango, N.Y.

[73] Assignee: Carrier Corporation, Syracuse, N.Y.

[21] Appl. No.: 76,444

[22] Filed: Jul. 21, 1987

[51] Int. Cl.$^4$ .................. F04C 2/356; F04C 15/00; F04B 39/12; B23K 31/00

[52] U.S. Cl. ........................... 418/63; 417/902; 29/156.4 R; 228/103

[58] Field of Search .................. 418/1, 2, 63–67, 418/243–251, 270; 417/902; 29/156.4 R; 228/103

[56] References Cited

FOREIGN PATENT DOCUMENTS 60-101290 6/1985 Japan ..................................... 418/63
61-28784 2/1986 Japan ................................... 418/248

Primary Examiner—John J. Vrablik
Attorney, Agent, or Firm—David J. Zobkiw

[57] ABSTRACT

A rotary cylinder is tested by loading in two fixed and one movable locations until a location of the movable point is found at which no, or a predetermined amount of, distortion takes place in the vane slot. The cylinder is then welded into a shell at the three points without producing distortion of the vane slot or with a predetermined distortion.

12 Claims, 2 Drawing Sheets

ROTARY CYLINDER CONFIGURATION AND METHOD TO CONTROL SLOT DIMENSIONS DURING DIRECT WELD ATTACHMENT TO THE SHELL

BACKGROUND OF THE INVENTION

In a fixed vane or rolling piston compressor, a vane reciprocates in a vane slot formed in the cylinder as the vane acts as a cam follower relative to the eccentric piston. The vane divides a crescent shaped chamber formed by the piston and cylinder into a suction chamber and a discharge chamber and is therefore subject to a pressure differential. Because of this pressure differential across the vane, there is a tendency for leakage. A small clearance between the vane and the slot results in optimum compressor efficiency, but a minimum clearance must be maintained to allow the vane to slide in the slot reliably. Welding processes used to attach the cylinder to the shell result in residual forces on the cylinder body. The inward residual effect of these forces can cause the cylinder slot to collapse or open depending upon where they are applied. Variations in the welding process can cause variability in the magnitude of the residual forces resulting in varying degrees of slot collapse or opening. Larger clearances must therefore be provided to compensate for the potential slot collapse which can result from welding process variations. Slot opening can also increase acceptable clearances. These larger clearances result in a lower efficiency due to increased leakage.

SUMMARY OF THE INVENTION

A cylinder for a fixed vane compressor is formed with two, diametrically asymmetrically located, different sized circumferential segments. The vane slot is asymmetrically located in the smaller one of the two circumferential segments and the projected axis of the slot generally divides the larger circumferential segment. Two weld points are located on the larger circumferential segment on opposite sides of and 30°-60° from the projected axis of the slot and a third weld point is located in the general location of the slot at a determined point of balanced residual welding force effects. However, if necessary, or desired, the third weld point can be located to open or close the slot a predetermined amount.

It is an object of this invention to minimize slot collapse during the welding attachment of a rotary cylinder to the shell.

It is a further object of this invention to provide a predetermined slot width after welding.

It is another object of this invention to eliminate slot distortion due to the effects of welding. These objects, and others as will become apparent hereinafter, are accomplished by the present invention.

Basically, starting with a cylinder suitable for use in the compressor design, two cylinder weld attachment points are located and held fixed on the larger circumferential portion on opposite sides of the projected vane axis and preferably equally spaced from the axis with a total spacing of 60°-120°. The third point necessary to balance the forces of the weld points is determined by measuring slot collapse using a calibrated strain gage. The cylinder is loaded in a press with contact occurring at the two selected fixed points and a third point which is varied until balance occurs. Cylinders of that design are then welded into a shell at the two related and third determined points without slot collapse. Alternatively, the third point can be located to produce a predetermined opening or closing of the slot as required by the relative dimensions and clearances of the parts relative to the design dimensions and clearances.

BRIEF DESCRIPTION OF THE DRAWINGS

For a fuller understanding of the present invention, reference should now be made to the following detailed description taken in conjunction with the accompanying drawings wherein.

DESCRIPTION OF THE PREFERRED EMBODIMENT

Figure 1:
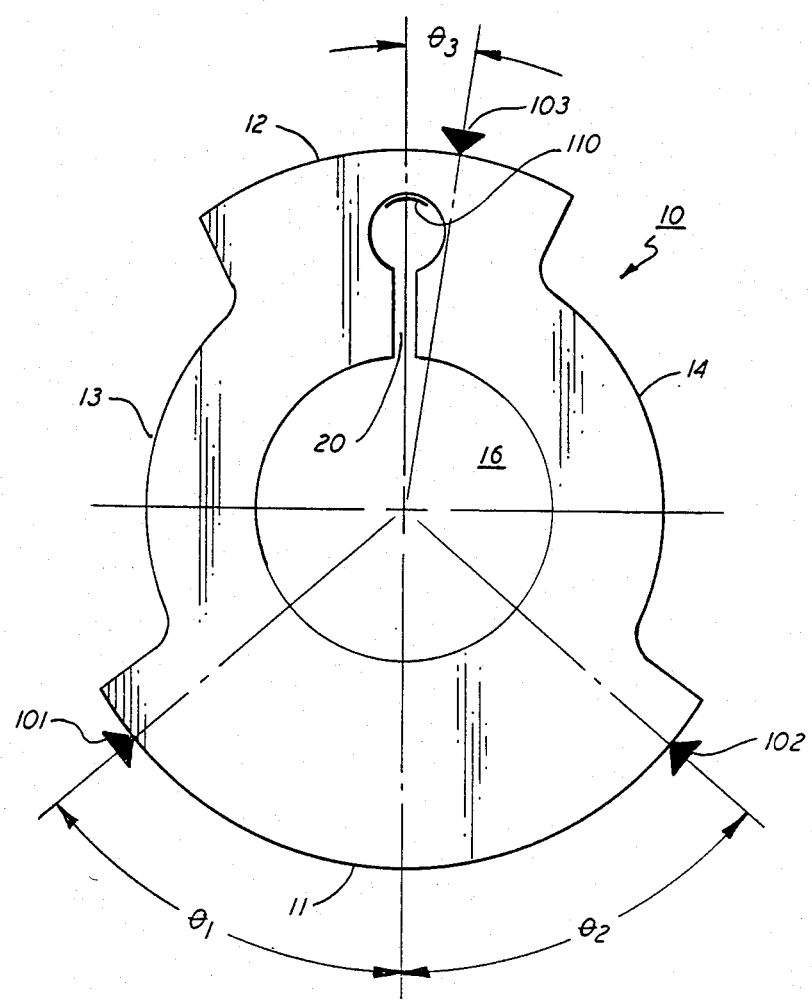
FIG. 1 is a view of the rotary cylinder being loaded to determine the balanced load points.
Figure 2:
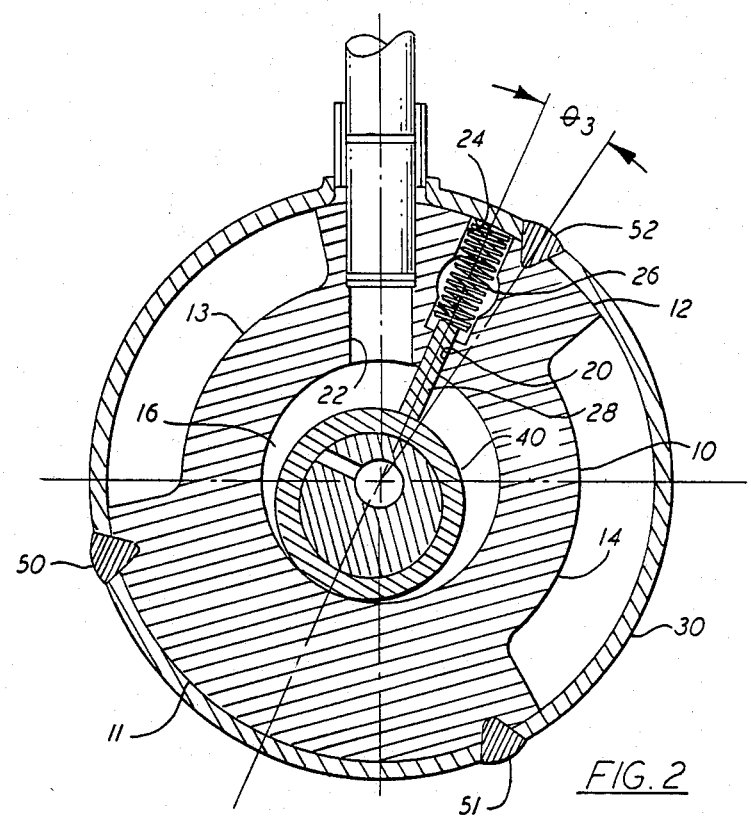
FIG. 2 is a sectional view of a rolling piston compressor assembled and welded according to the teachings of the present invention.

In designing the rotary cylinder of a rolling piston compressor, certain design features are needed and/or desired. For example, it is desirable to minimize weight, and it is necessary to provide refrigerant and oil passages through the cylinder. Also, the cylinder configuration and attachment points can affect sound transmission. When a suitable rotary cylinder 10 is designed, it may then be tested to determine the proper welding locations for obtaining or maintaining the designed slot clearances upon assembly and welding. Referring now to FIG. 1, rotary cylinder 10 has first and second circumferential areas 11 and 12, respectively, which are separated by recessed areas 13 and 14, respectively, with circumferential area 11 being larger than circumferential area 12. The circumferential areas 11 and 12 are diametrically asymmetrically located. Cylindrical compressor chamber 16 is formed in rotary cylinder 10. Vane slot 20 is of a keyhole shaped configuration, as viewed in FIG. 1, and is located radially outward with respect to chamber 16 such that the projected axis of slot 20 essentially bisects circumferential area 11. Additionally, as shown in FIG. 2, inlet 22 terminates in chamber 16 in close proximity to vane slot 20. Bore 24 forms a radial extension of a portion of slot 20 and extends through circumferential area 12 so as to receive spring 26 which biases vane 28 against piston 40. Except for the size and location of circumferential areas 11 and 12 and vane slot 20 with respect to each other, rotary cylinder 10 is generally conventional.

Figure 3:
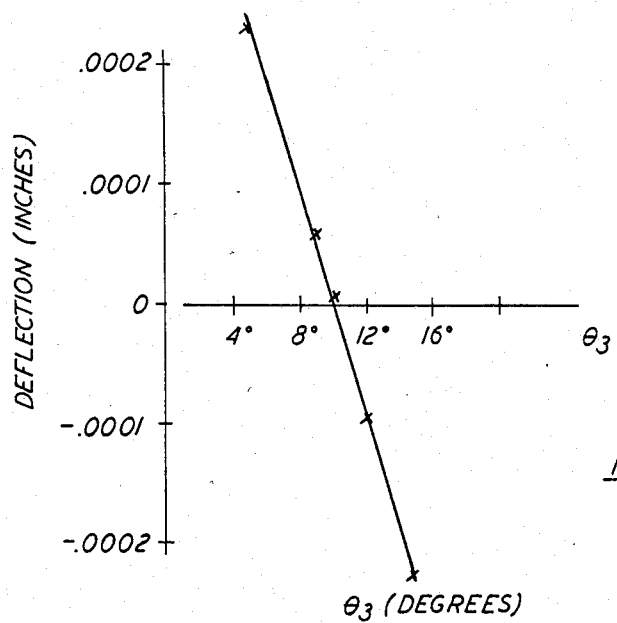
FIG. 3 is a graph of deflection vs. $\theta_3$ for a loading force 500 lbs. and for $\theta_1$ and $\theta_2$ each equal to 47°.

As best shown in FIG. 2, vane slot 20, inlet 22 and bore 24 are all located in the same general circumferential location and each constitute discontinuities in stress and heat distribution patterns. To locate the proper welding points to prevent or regulate vane slot collapse or opening due to these discontinuities, rotary cylinder 10 is placed such that circumferential area 11 is supported by line or point contact at two selected locations by supports 101 and 102 which are located at angles $\theta_1$ and $\theta_2$, respectively, from the projected axis of vane slot 20. Angles $\theta_1$ and $\theta_2$ are between 30 and 60° and may be different or identical, but they are held fixed while support 103 is moved until a location is found in which no strain, as measured by calibrated strain gage 110, occurs in the area of slot 20 when forces representative of the welding forces are applied as line or point contacts through supports 101–103 which are loaded through a press or any other suitable device. The angle, $\theta_3$, for support 103 is determined for the no strain loading and these three locations $\theta_1$, $\theta_2$ and $\theta_3$ are used as the welding locations for securing rotary cylinder 10 in shell 30 without distorting vane slot 20. In comparing FIGS. 1 and 2 it is readily apparent that strain gage 110 and bore 24 are at the same angular location. They are, however, axially spaced so that strain gage 110 is above the bore 24 with reference to the assembled device. This results in locating the three coplanar weld points higher in the assembled device which has a noise reducing effect due to the resultant attachment points being closer to the mid point of the height of the compressor. In one specific example, $\theta_1$ and $\theta_2$ were each fixed at 47° and it was determined that no slot collapse occurred when support 103 loaded cylinder 10 at an angle $\theta_3$ of 5° from the axis of the vane slot. In this loading configuration an angle $\theta_3$ greater than 5° caused slot 20 to close while reducing $\theta_3$ below 5° caused the slot 20 to open. With $\theta_3$ held at 5° and with $\theta_1$ and $\theta_2$ being held equal, it was determined that reducing $\theta_1$ and $\theta_2$ below 47° caused vane slot 20 to open. Rebalancing can then be accomplished by increasing $\theta_3$ above 5° with $\theta_1$ and $\theta_2$ less than 47°. In another specific example, tests were performed on a different sized cylinder. The loading force was 500 lbs. and $\theta_1$ and $\theta_2$ were held at 47°. With $\theta_3$ varied, the resultant deflection or slot collapse/opening in ten thousandths of an inch is plotted against $\theta_3$ in FIG. 3. Calibrated vanes or blocks can be used to determine the amount of vane slot opening or collapse. For example, if the slot 20 and/or vane 28 were of such dimensions as to be out of design specification, the proper clearances can be established by locating support 103 at a proper location, as determined by calibrated vane or block 28, to produce the desired clearance. Obviously, the amount of opening or closure is limited to a few ten thousandths of an inch which is large relative to the design tolerances.

Referring now to FIG. 2, rotary cylinder 10 has been welded in shell 30 by welds 50, 51 and 52 which correspond to the locations of values of $\theta_1$, $\theta_2$ and $\theta_3$ which produced no slot collapse or the desired slot dimension. It should be noted that welds 50-52 are preferably in a plane above bore 24 and not in the same plane, as illustrated. The welding of the cylinder 10 in the shell 30 is of the conventional through welding process and produces welds 50-52 having three dimensions rather than being located at a point or line as are supports 101-103. Thus, welds 50-52 extend over several degrees centered on $\theta_1$-$\theta_3$, respectively.

It should be understood that the size and relative locations of vane slot 20, inlet 22, bore 24 and the sizes and locations of circumferential areas 11 and 12 can all influence the values of $\theta_1$, $\theta_2$ and $\theta_3$ so that testing should take place for each specific design.

Although a preferred embodiment of the present invention has been illustrated and described, other changes will occur to those skilled in the art. It is therefore intended that the scope of the present invention is to be limited only by the scope of the appended claims.

What is claimed is:

1. A method for locating three weld points for securing a rotary cylinder having a vane slot in a shell with predetermined slot distortion comprising the steps of:
   (a) selecting two loading points on the cylinder on opposite sides of the projected axis of the vane slot:
   (b) while keeping the two loading points fixed, selectively locating a third loading point on the cylinder in the general vicinity of the vane slot;
   (c) loading the cylinder at the three points;
   (d) determining the strain on the vane slot due to loading the cylinder;
   (e) continually repositioning the third loading point and repeating steps (c) and (d) until a third loading point is located at which strain representative of the predetermined slot distortion occurs at the vane slot.

2. The method of claim 1 wherein the two selected loading points on the cylinder are located 30°-60° on each side of the projected axis of the van slot.

3. The method of claim 2 wherein the two selected loading points are each 47° from the projected axis of the 4. The method of claim 1 further including the step of welding the rotary cylinder into a shell at the two selected and third determined loading points.

5. The method of claim 4 wherein said step of welding includes locating the welds at the upper portion of the cylinder.

6. The method of claim 1 further including the step of determining the slot distortion each time the cylinder is loaded.

7. The method of claim 1 wherein the third loading point is one at which no distortion occurs.

8. In a hermetic compressor having a shell, a rotary cylinder having a central cylindrical compressor chamber, first and second asymmetrically located circumferential areas spaced by first and second recessed areas with said first circumferential area being larger than said second circumferential area, a radially extending vane slot formed in said cylinder and terminating in said compressor chamber such that a projection of the axis of said vane slot essentially bisects said first circumferential area, said rotary cylinder being welded in place in said shell at only three points two of which are on said first circumferential area and the third of which is on said second circumferential area.

9. The hermetic compressor of claim 8 wherein said two points on said first circumferential area are symmetrical with respect to said projection of the axis of said vane slot.

10. The hermetic compressor of claim 9 wherein said two points are each 47° from the projection of the axis of said vane slot.

11. The hermetic compressor of claim 8 wherein said third point is the point of balancing effects of residual forces produced by welding whereby distortion of said vane slot due to welding is minimized.

12. The hermetic compressor of claim 8 wherein said third point is the point at which a predetermined dimensional change occurs in said slot due to the effects of residual forces produced by welding.

* * * * *